(12) United States Patent
Vyas et al.

(10) Patent No.: US 11,782,940 B2
(45) Date of Patent: Oct. 10, 2023

(54) SYSTEM AND METHOD FOR IDENTIFYING SIMILAR QUERIES BY A CUSTOMER ON DIFFERENT DIGITAL CHANNELS IN A MULTICHANNEL CONTACT CENTER

(71) Applicant: inContact INC., Sandy, UT (US)

(72) Inventors: Rahul Vyas, Jodhpur (IN); Salil Dhawan, Pune (IN)

(73) Assignee: INCONTACT INC., Sandy, UT (US)

( * ) Notice: Subject to any disclaimer, the term of this patent is extended or adjusted under 35 U.S.C. 154(b) by 135 days.

(21) Appl. No.: 17/506,684

(22) Filed: Oct. 21, 2021

(65) Prior Publication Data

US 2023/0130020 A1    Apr. 27, 2023

(51) Int. Cl.
| | |
|---|---|
| *G06F 16/24* | (2019.01) |
| *G06F 16/2458* | (2019.01) |
| *G06F 16/2452* | (2019.01) |
| *H04M 3/51* | (2006.01) |
| *G06F 40/30* | (2020.01) |

(52) U.S. Cl.
CPC ...... *G06F 16/2474* (2019.01); *G06F 16/24522* (2019.01); *G06F 40/30* (2020.01); *H04M 3/5183* (2013.01)

(58) Field of Classification Search
CPC .............. G06F 16/2474; G06F 16/24522
See application file for complete search history.

(56) References Cited

U.S. PATENT DOCUMENTS

| | | | | |
|---|---|---|---|---|
| 10,594,865 | B2* | 3/2020 | Deole et al. | ........ H04M 3/5183 |
| 2020/0045175 | A1* | 2/2020 | Deole et al. | ........ H04M 3/5232 |

* cited by examiner

*Primary Examiner* — Baoquoc N To
(74) *Attorney, Agent, or Firm* — Sharone Godesh; Daniel Schatz; Soroker-Agmon-Nordman

(57) ABSTRACT

A computerized-method for improving queries operation in a multichannel contact center is provided herein. The computerized-method includes: (i) operating a stream processing application for each new query of a customer to store query-related data and to identify one or more queries of the customer in a cloud-contact data store. The cloud-contact data store may have one or more interactions-queue types, when one or more queries have been identified: (a) operating a repetition module on the identified one or more queries of the customer to filter out two or more queries having a common query-topic; (b) operating a Natural Language Understanding (NLU) module on the filtered two or more queries having a common topic to identify two or more identical queries. Each query of the identified two or more identical queries have a unique query identification number; and (c) handling the two or more identical.

8 Claims, 7 Drawing Sheets

SYSTEM AND METHOD FOR IDENTIFYING SIMILAR QUERIES BY A CUSTOMER ON DIFFERENT DIGITAL CHANNELS IN A MULTICHANNEL CONTACT CENTER

TECHNICAL FIELD

The present disclosure relates to the field of computerized systems and methods for identifying similar queries by a customer in different digital channels, in a multichannel contact center.

BACKGROUND

A recent survey by callcenter.co.uk showed that 82% of contact centers reported that employee morale had increased since implementing a multi-channel solution and nearly 100% reported that it was easier to attract and retain agents in a 'more varied' role. Whilst 'voice', i.e., phone call channel, is still clearly representing the lion-share of contact-method, researches show that the percentage of customer interactions via phone call channel has dropped from 90.1% down to 73.2% between 2006 and 2013. Meanwhile, other channel types are rising fast, such as email, webchat and social media.

Once a multi-channel platform is in place in contact centers, solving customer queries via channel types, other than voice channel, can reduce the contact center's costs. For instance, a webchat session costs less on average by 40% than a session via a phone call channel. Customer satisfaction may be increased due to optimized multi-channel support, reduced wait time and low abandonment rate. A popular metric used to measure customer loyalty and satisfaction, such as Net Promoter Score (NPS), may show a marked improvement. For a contact center, an average NPS growth of 7% correlates with a 1% growth in revenue.

Poor customer service may cost businesses more than $75 billion a year, according to a report from NewVoiceMedia. Just a 5% increase in customer retention can boost a company's profitability, by as much as 75%, according to 'Bain and Company', a global management consulting firm, reducing an average wait time for customers may be directly proportional to customer satisfaction. As wait time increases for a customer complaint, customer satisfaction may start dropping.

However, when a contact center is implementing a multi-channel solution, customers may approach several different channels for the same query to reduce their wait-time for response. For example, a customer may call customer service via 'voice' channel and may find out that there's a wait-time of 20 minutes. While the customer is on hold, the customer may head over to the website and jump into the live chat queue. The customer may also operate a search for Twitter chat to handle and submit a query that way. By sending the same query across different channel types, the customer may pit the different channels against one another in a race to save time.

Looking beyond the surface level, this situation may cost a lot of money, because agents which are responsible for handling each of those different channels will get pulled into that service ticket to respond to the customer query. When social media lies outside the contact center, this can quickly become a problem. Not only are efforts more likely to be duplicated, but customer frustration is likely to grow when there's inconsistency between the different responses via the different channel types.

Accordingly, there is a need for a technical solution for identifying similar queries asked by the same customer across different digital channels and for resolving the query on the customer's preferred channel. Thus, a closure of subsequent similar queries once the identified query is resolved on one channel, such as the channel type that its related interactions-queue has the lowest wait time or on the customer's preferred channel, may reduce call queue volume and wait time, increase the efficiency of usage of agent time and provide an accurate view of actual contact center interactions load.

Existing solutions as of today, don't have a mechanism which can identify similar queries by the same customer on multiple channels, which may lead to a quick query resolution and to an improved contact center performance.

Therefore, there is a need for a system and method for identifying similar queries by a customer on different digital channels in a multiple-channel contact center.

SUMMARY

There is thus provided, in accordance with some embodiments of the present disclosure, a computerized-method for improving queries operation in a multichannel contact center.

In accordance with some embodiments of the present disclosure, the computerized-method may include operating a stream processing application for each new query of a customer to store query-related data in a cloud-contact data store and to identify one or more queries of the customer in the cloud-contact data store. The cloud-contact data store may have one or more interactions-queue types.

Furthermore, in accordance with some embodiments of the present disclosure, when one or more queries may have been identified, the computerized-method is further comprising: (i) operating a repetition module on the identified one or more queries of the customer to filter out two or more queries having a common query-topic ; (ii) operating a Natural Language Understanding (NLU) module on the filtered two or more queries having a common topic to identify two or more identical queries. Each query of the identified two or more identical queries have a unique query identification number; and (iii) handling the two or more identical.

Furthermore, in accordance with some embodiments of the present disclosure, the handling of the two or more identical queries may be operated by: (i) operating a primary channel identification module to determine a primary channel-type for a query to be resolved, from the identified two or more identical queries. The query may have a query identification number, (ii) reducing a priority of all queries having a different query identification number than the query to be resolved, in each related interactions-queue type; (iii) having an agent interacting with the customer regarding the query to be resolved, via the primary channel-type; and (iv) removing all queries having a different query identification number than the query to be resolved from each related interactions-queue type, after the query to be resolved has been marked as resolved.

Furthermore, in accordance with some embodiments of the present disclosure, the query-related data may include: a customer identification-number; a query identification-number; a channel-type; a query initiation-time; an estimated wait-time; and a query-topic.

Furthermore, in accordance with some embodiments of the present disclosure, the stream processing application may identify one or more queries of the customer based on the customer identification-number.

Furthermore, in accordance with some embodiments of the present disclosure, after the determining of the primary channel-type for the query to be resolved, the computerized-method may further include sending a notification to the customer as to the customer preferred primary channel-type. Upon customer response, the computerized-method may further comprise updating the determined primary channel-type when the primary channel-type is different than the customer preferred primary channel-type.

Furthermore, in accordance with some embodiments of the present disclosure, the primary channel identification module to determine the primary channel-type may be operating by checking a wait-time of each interactions-queue type and selecting the primary channel-type according to related channel-type of interactions-queue having a lowest wait-time.

Furthermore, in accordance with some embodiments of the present disclosure, when the computerized-method is operating in a cloud computing environment, before operating the stream processing application, the computerized-method may be further comprising, selecting a tenant from a data store of tenants, every duty cycle period, to operate the stream processing application for each new query of a customer in the cloud-contact data store of the selected tenant.

There is further provided, in accordance with some embodiments of the present invention, a computerized-system for improving queries operation in a multichannel contact center.

Furthermore, in accordance with some embodiments of the present disclosure, the computerized-system may include: one or more processors; a cloud-contact data store; and a memory to store the cloud contact data store.

Furthermore, in accordance with some embodiments of the present disclosure, the one or more processors may be configured to operate a stream processing application for each new query of a customer. The stream processing application may be operated to store query-related data and to identify one or more queries of the customer in the cloud-contact data store. The cloud-contact data store may have one or more interactions-queue types. When one or more queries have been identified the one or more processors may be configured to: (i) operate a repetition module on the identified one or more queries of the customer to filter out two or more queries having a common query-topic; (ii) operate a Natural Language Understanding (NLU) module on the filtered two or more queries having a common topic to identify two or more identical queries. Each query of the identified two or more identical queries have a unique query identification number; and (iii) handle the two or more identical queries.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1A:
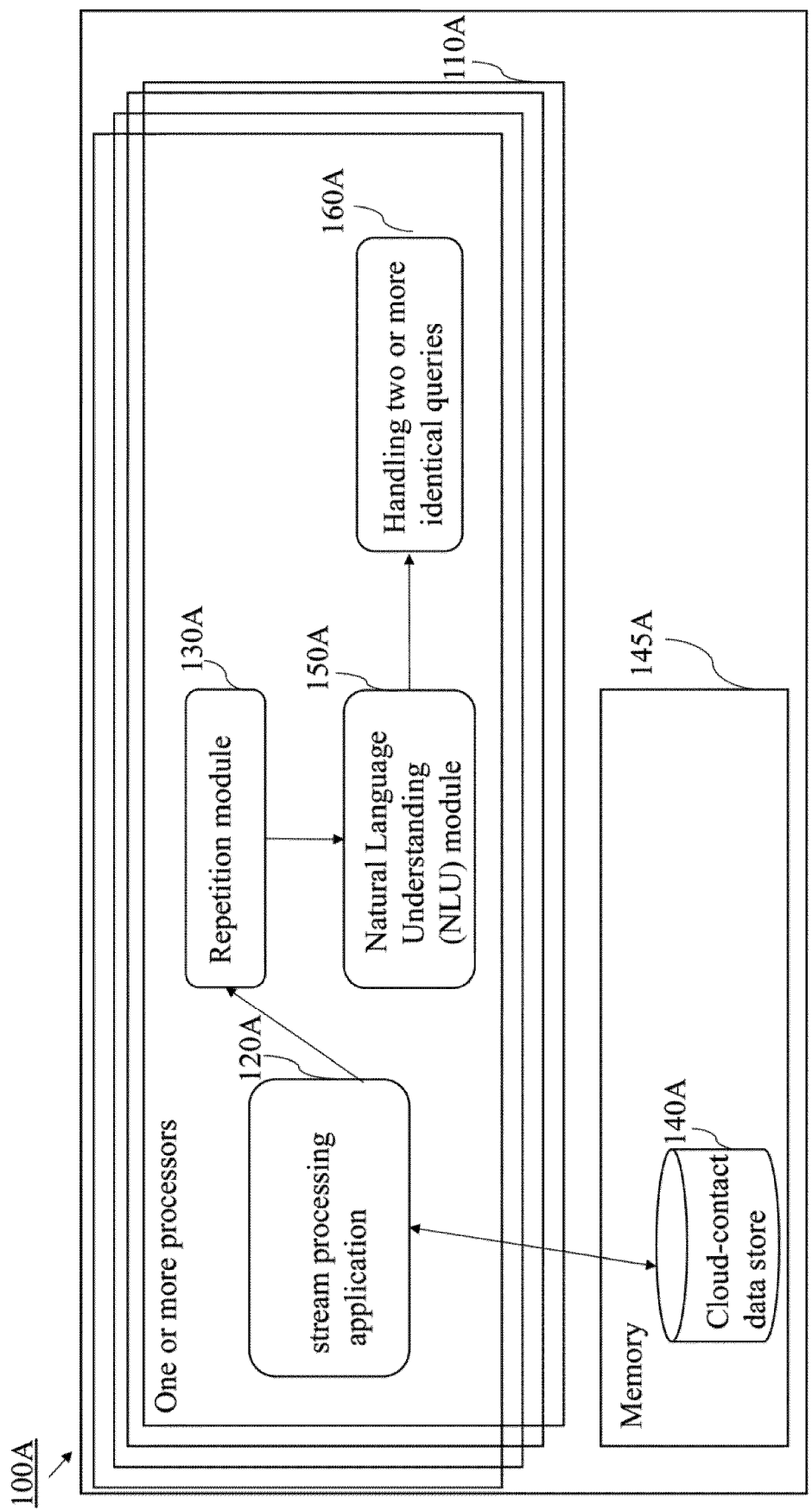
FIGS. 1A-1B schematically illustrates a high-level diagram of a computerized-system for improving queries operation in a multichannel contact center, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "channels" as used herein, refers to communication channels in a contact center for an interaction between a customer and an agent. For example, voice, chat, email Short Message Service (SMS) and the like.

In a multichannel contact center, customers are entitled to interact with agents over different communication channel types. Occasionally, customers try to connect to the contact center via different channel types for the same query in an expectation for a quick query resolution via any of the available channels.

Contact centers are challenged to be efficient and improve customer experience at the same time. However, for example, a customer for the same query may approach the contact center via various communication channels, such as a voice call, chat, email, text messages, social media to name a few. Each query may enter an interactions-queue that is related to the channel type. As a result, it may increase wait time for all customers having a query in one of the interactions-queues, which may lead to an unpleasant customer experience for all other customers. When wait time increases, so does the abandon rate. From the aspect of the agent, an inefficient usage of agent time may decrease the agent productivity. Moreover, having the same query of the same customer waiting for response in different interactions-queues may generate an incorrect view of the actual contact center load at different times which may lead to skewed service requirements.

Accordingly, there is a need for a technical solution for identifying such similar queries on multiple channels by a customer and lead to a quick query resolution and an improved contact center performance. Furthermore, there is a need for a system and method for improving queries operation in a multichannel contact center.

FIG. 1A schematically illustrates a high-level diagram of a computerized-system 100A for improving queries operation in a multichannel contact center, in accordance with some embodiments of the present invention.

According to some embodiments of the present disclosure, a computerized system in a multichannel contact center, such as computerized-system 100A, may identify identical queries asked by a customer across different digital channels and handle the two or more identical queries 160A. The handling of the two or more identical queries 160A may be operated by resolving the query on a determined primary channel and lowering the query queue position of similar queries on auxiliary channels to improve wait time of other queries which are not identical to the resolved query. The computerized-system 100A may further operate a closure of subsequent similar queries once the query is resolved on the determined primary channel.

According to some embodiments of the present disclosure, the computerized-system 100A may include one or more processors, such as one or more processors 110A, a data store, such as cloud-contact data store 140A and a memory to store the cloud contact data store 145A.

According to some embodiments of the present disclosure, the one or more processors 110A in computerized-system 100A may be configured to operate an application, such as a stream processing application 120A for each new query of a customer and to store query-related data in the cloud-contact data store 140A. The stream processing application 120A may also identify one or more queries of the customer in the cloud-contact data store 140A, which is having one or more interactions-queue types.

According to some embodiments of the present disclosure, the stream processing application 120A may compile a list of all available interactions-queue types and then provide it to a module such as repetition module 130A. When a customer has posted a new query while creating a new account, then the stream processing application 120A may return a list of queries asked by the same customer. The list of queries may be provided to a repetition module 130A to filter out two or more queries having a common query-topic.

According to some embodiments of the present disclosure, the stream processing application 120 may operate an image processor to identify a customer based on the customer profile picture in the various communication channel types, e.g., interactions-queue types. the stream processing application 120A may also operate a profile processor to process user profile information, i.e., customer profile information, such as first name, last name, full name, address, handle information to identify similar profile of the customer in the different communication channel types. For example, chat via Twitter, chat via Facebook and chat via WhatsApp. In each application the user has a profile.

According to some embodiments of the present disclosure, when a customer creates a new account on a channel, e.g., in-order to post a query the agent has to login to a channel, then its metadata information may contain information, e.g., in a JavaScript Object Notation (JSON) document, which may be sent to a channel analyzer module, such as stream processing application 120A. The metadata may include first name, last name, handle, and a list of queries if already posted during a duty cycle. The stream processing application 120A may forward the metadata of the list of queries to the repetition module 130A. The cloud contact data store 140A may store user information based on the diagram 400 of identifying same customer on different channels when customer creates a new query 400 in FIG. 4.

According to some embodiments of the present disclosure, the image processor may use byte code attribute to compare the images available inside other channels and if there is any match found on the other channel types then current channel information may be stored inside cloud contact data store 140A. For example, a customer 'U1' may create a new account on channel 'd1', as shown in element 370 in FIG. 3 and the customer's image may be available in 'd2' channel, then 'd1' channel will be added for the same customer 'U1' as shown in element 370 in FIG. 3.

According to some embodiments of the present disclosure, if there is no match found for the image, then the profile processor may use the customer metadata and may use profile information such as address, education, experience, interest, age, gender, name and check whether the same profile exists on the alternate channel or not. For example, as shown in table 370 in FIG. 3, if same profile information is available on channel 'd2', then customer 'U1' information may be updated in cloud-contact data store 140A as having two channels 'd1', 'd2'.

According to some embodiments of the present disclosure, if there is no match found for the image as well as for the profile information on any other channel, it means that the customer does not have a query on any other channel type, hence a unique user id information may be generated and stored in the cloud-contact data store 140A.

Figure 3:
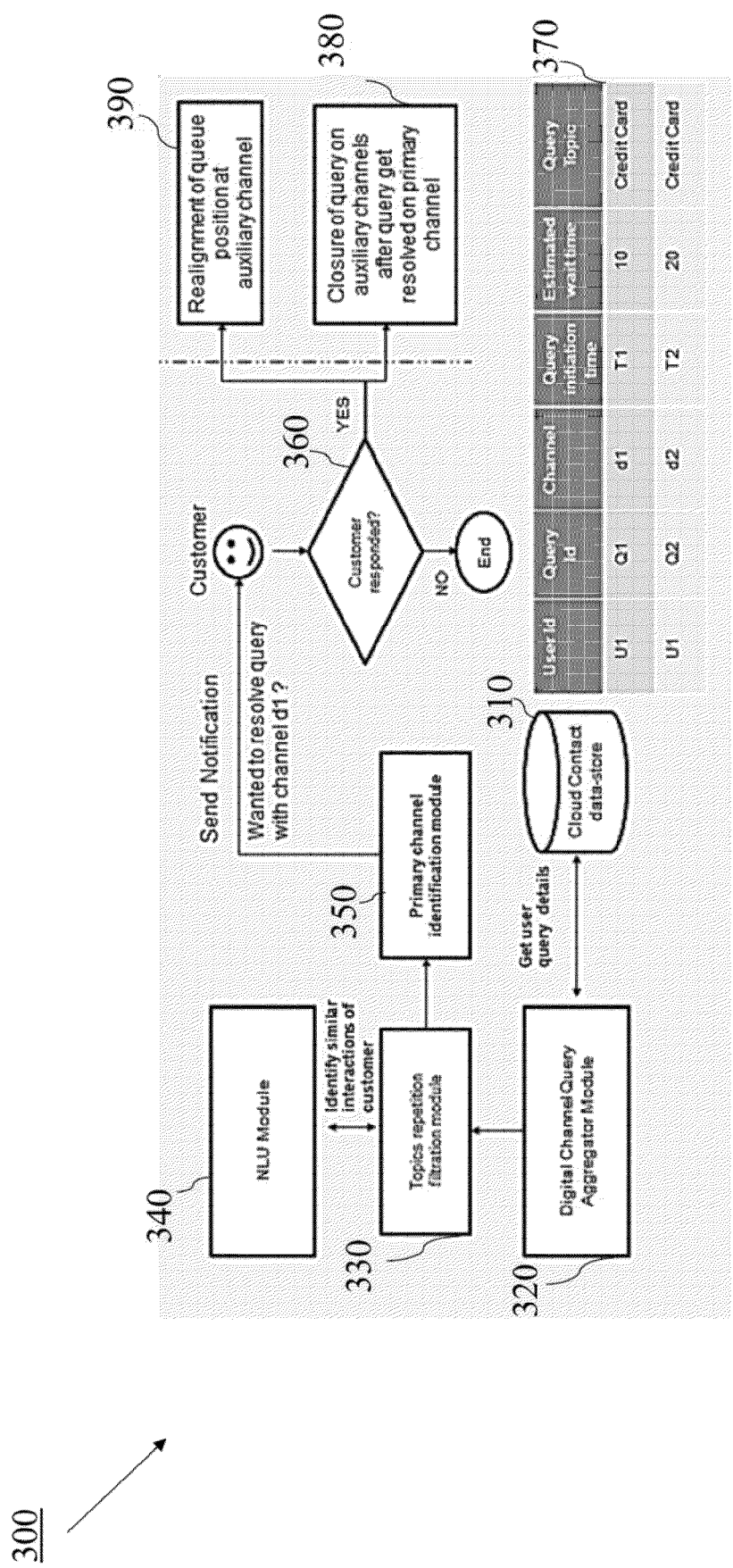
FIG. 3 schematically illustrates a high-level architecture diagram of identifying similar queries asked by the customer, in a contact center, in accordance with some embodiments of the present invention.

According to some embodiments of the present disclosure, the query related data may include a customer identification-number, a query identification-number, a channel-type, a query initiation-time, an estimated wait-time and a query-topic as shown in element 370 in FIG. 3. The query-topic may denote the problem area upon which the customer has placed the queries. For example, the problem areas can be related to credit card issue, account information and the like.

According to some embodiments of the present disclosure, the stream processing application 120A may process an incoming flow of data and send relevant metadata information to the repetition module 130A. In a non-limiting example, the data may be in JavaScript Object Notation (JSON) format.

According to some embodiments of the present disclosure, the purpose of maintaining a cloud contact data store, such as cloud-contact data store 140A, having query related data stored thereon, is to have users information available across the different channel types, e.g., interactions-queue types, which are stored in the cloud-contact data store 140A, so that in a later stage a primary channel may be identified to resolve a query that has multiple instances in different channel types.

According to some embodiments of the present disclosure, the cloud contact data store 140A may be actively used during the updating of user information as to queries across the different channel types and also used for reading the data whenever a module, such as repetition module 130A may run as per a configurable duty cycle.

According to some embodiments of the present disclosure, user information, i.e., customer information, as to queries, across the different interactions-queue types, may be stored in the cloud-contact data store 140A when a new user, e.g., a new customer, may create an account on a digital channel or when a customer creates a query on a digital channel at the first time.

According to some embodiments of the present disclosure, first time as referred to herein means when a user, i.e., customer, has posted a query on a channel, at the first time then this channel information may or may not be stored in the cloud contact data store 140A hence if the channel information related to the user is not present then it is added for given user ID, as shown in table 370 in FIG. 3.

According to some embodiments of the present disclosure, when one or more queries of the customer have been identified, in the cloud-contact data store 140A, the one or more processors 110A may be configured to operate a module, such as repetition module 130A on the identified one or more queries of the customer to filter out two or more queries having a common query-topic. Then, the one or more processors 110A may be configured to operate a module, such as a Natural Language Understanding (NLU) module 150A, on the filtered two or more queries which are having a common topic to identify two or more identical queries. Each query of the identified two or more identical queries may have a unique query identification number.

According to some embodiments of the present disclosure, the stream processing application 120A may be identifying one or more queries of the customer based on the customer identification-number. The one or more processors 110A may be configured to handle the two or more identical queries 160A.

Figure 1B:
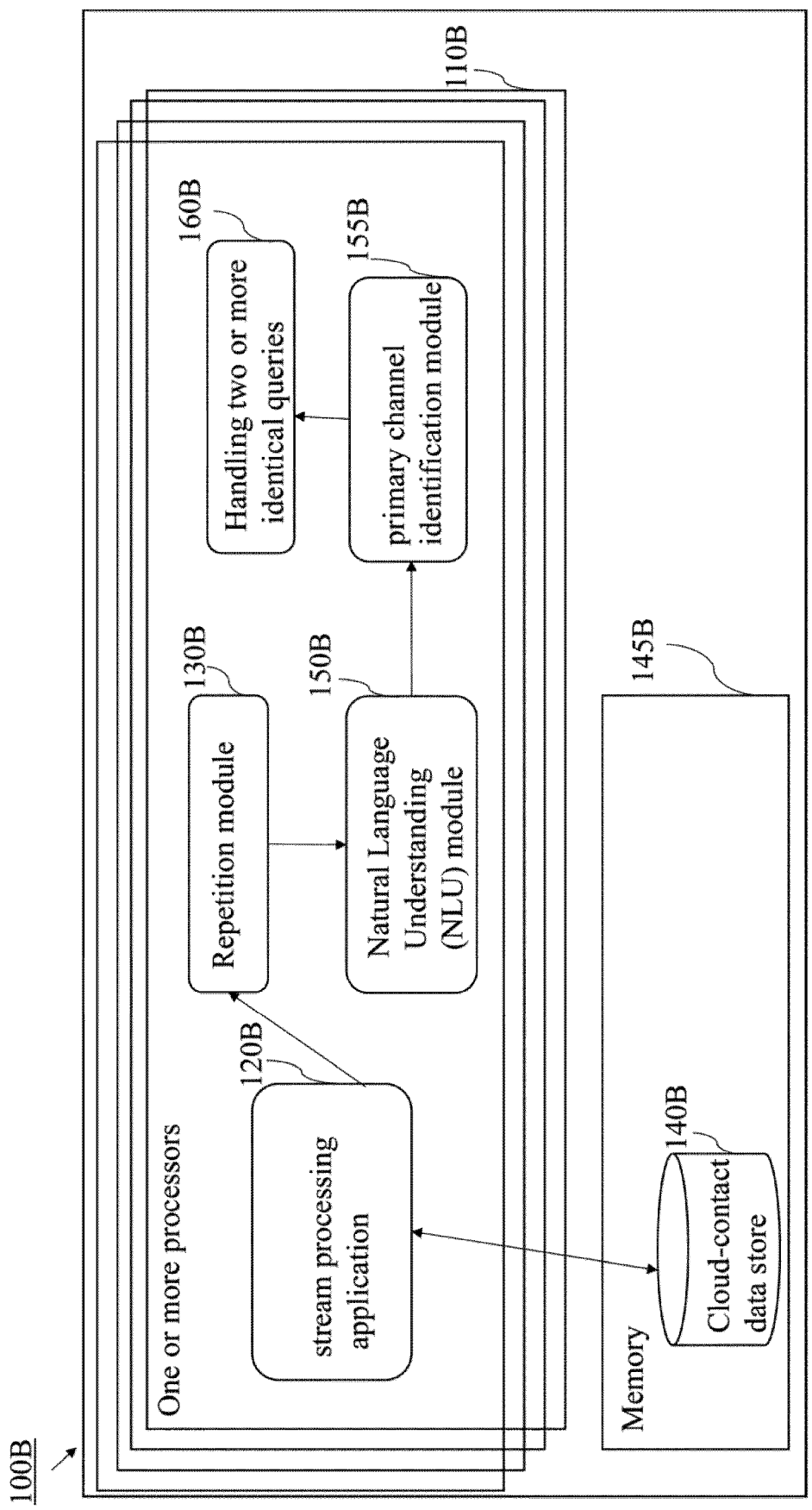

FIG. 1B schematically illustrates a high-level diagram of a computerized-system 100B for improving queries operation in a multichannel contact center, in accordance with some embodiments of the present invention.

According to some embodiments of the present disclosure, a computerized system in a multichannel contact center, such as computerized-system 100B, which includes the components of system 100A in FIG. 1A, may identify identical queries asked by a customer across different digital channels and handle the two or more identical queries 160B.

According to some embodiments of the present disclosure, the handling of the two or more identical queries may be operated by operating a primary channel identification module to determine a primary channel-type for a query to be resolved, from the identified two or more identical queries. Each query of the two or more identical queries has a query identification number. Then, reducing a priority of all queries from the two or more identical queries which are having a different query identification number, than the query to be resolved, in each related interactions-queue type and having an agent interacting with the customer regarding the query to be resolved, via the primary channel-type.

According to some embodiments of the present disclosure, the handling of the two or more identical queries may be further operated by removing all queries from the two or more identical queries which are having a different query identification number than the query to be resolved from each related interactions-queue type, after the query to be resolved has been marked as resolved. Thus, by removing identical queries of the dame customer from one or more interactions-queues, improving queries operation in the multichannel contact center.

According to some embodiments of the present disclosure, a module to determine the primary channel-type, such as the primary channel identification module 155B, may be operating by checking a wait-time of each interactions-queue type and selecting the primary channel-type according to related channel-type of interactions-queue having a lowest wait-time.

According to some embodiments of the present disclosure, after the determining of the primary channel-type for the query to be resolved, a notification may be sent to the customer as to the customer preferred primary channel-type. Upon customer response as to the customer's preferred primary-channel type, the primary channel-type may be updated to the customer's preferred primary-channel type, when the primary channel-type that has been determined by the primary channel identification module 155B is different than the customer preferred primary channel-type.

According to some embodiments of the present disclosure, when the system 100B may be operating in a cloud computing environment, before operating the stream processing application 120B, a tenant may be selected from a data store of tenants, every duty cycle period, to operate the stream processing application 120B for each new query of a customer in the cloud-contact data store, such as cloud-contact data store 140B of the selected tenant.

Figure 2:
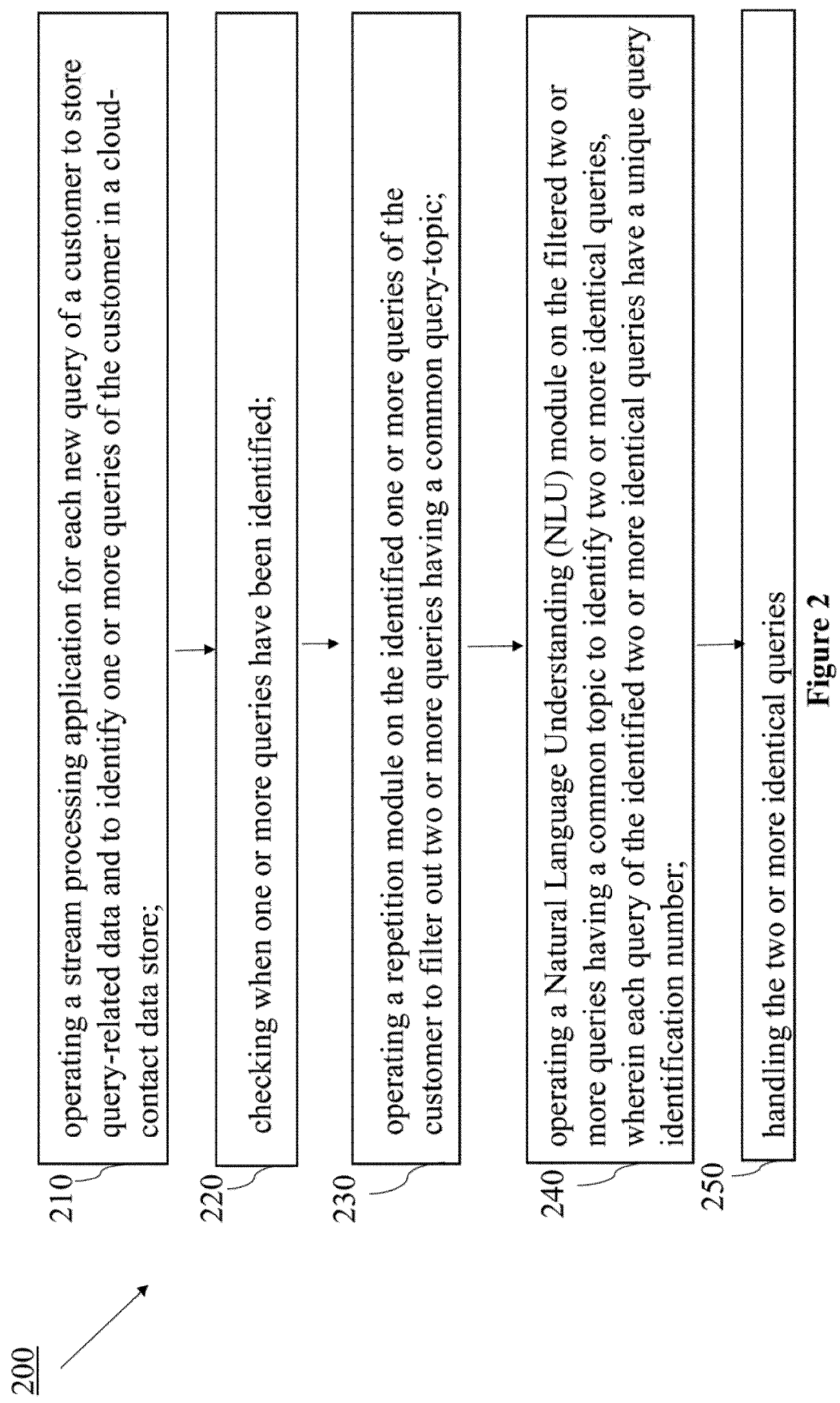
FIG. 2 schematically illustrates a high-level diagram of a computerized-method for improving queries operation in a multichannel contact center, in accordance with some embodiments of the present invention.

FIG. 2 schematically illustrates a high-level diagram of a computerized-method 200 for improving queries operation in a multichannel contact center, in accordance with some embodiments of the present invention.

According to some embodiments of the present disclosure, operation 210 may comprise operating a stream processing application for each new query of a customer to store query-related data and to identify one or more queries of the customer in a cloud-contact data store.

According to some embodiments of the present disclosure, operation 220 may comprise checking when one or more queries have been identified.

According to some embodiments of the present disclosure, operation 230 may comprise operating a repetition module on the identified one or more queries of the customer to filter out two or more queries having a common query-topic.

According to some embodiments of the present disclosure, operation 240 may comprise operating a Natural Language Understanding (NLU) module on the filtered two or more queries having a common topic to identify two or more identical queries. Each query of the identified two or more identical queries have a unique query identification number.

According to some embodiments of the present disclosure, operation 250 may comprise handling the two or more identical queries. The handling of the two or more identical queries may be improving queries operation in a multichannel contact center by resolving the query on one communication channel type and all realigning interactions-queues having identical queries and removing all the other identical queries from the interactions-queues after closure of the query.

FIG. 3 schematically illustrates a high-level architecture diagram 300 of identifying similar queries asked by the customer, in a contact center, in accordance with some embodiments of the present invention.

According to some embodiments of the present disclosure, a data store, such as cloud-contact data store 310 and such as cloud-contact data store 140 in FIGS. 1A-B may include query-related data. The query-related data may include: a customer identification-number; a query identification-number; a channel-type; a query initiation-time; an estimated wait-time; and a query-topic, as shown in table 370.

According to some embodiments of the present disclosure, a module, such as digital channel query aggregator module 320 may identify one or more queries of the customer in a cloud-contact data store 310. The cloud-contact data store may have one or more interactions-queue types.

According to some embodiments of the present disclosure, when one or more queries have been identified in the cloud-contact data store 310, a repetition module, such as topics repetition filtration module 330 may be operated on the identified one or more queries of the customer to filter out two or more queries having a common query-topic.

According to some embodiments of the present disclosure, the two or more queries having a common query-topic of the customer may be forwarded to a Natural Language Understanding (NLU) module, such as NLU module 340. The NLU module 340 may be operated on the filtered two or more queries having a common topic to identify two or more identical queries. Each query of the identified two or more identical queries have a unique query identification number.

According to some embodiments of the present disclosure, the identified two or more identical queries may be handled by operating a module, such as a primary channel identification module 350 to determine a primary channel-type for a query to be resolved, from the identified two or more identical queries. The query has a query identification number.

According to some embodiments of the present disclosure, the primary channel identification module 350 to determine the primary channel-type may be checking a wait-time of each interactions-queue type and selecting the primary channel-type according to related channel-type of interactions-queue having a lowest wait-time.

According to some embodiments of the present disclosure, after the determining of the primary channel-type for the query to be resolved, a notification may be sent to the customer as to the customer preferred primary channel-type. Upon customer response 360 updating the determined primary channel-type when the primary channel-type is different than the customer preferred primary channel-type. Then, performing realignment of queue position at auxiliary channel 390 and closure of query on auxiliary channels after query get resolved on primary channel 380.

Figure 4:
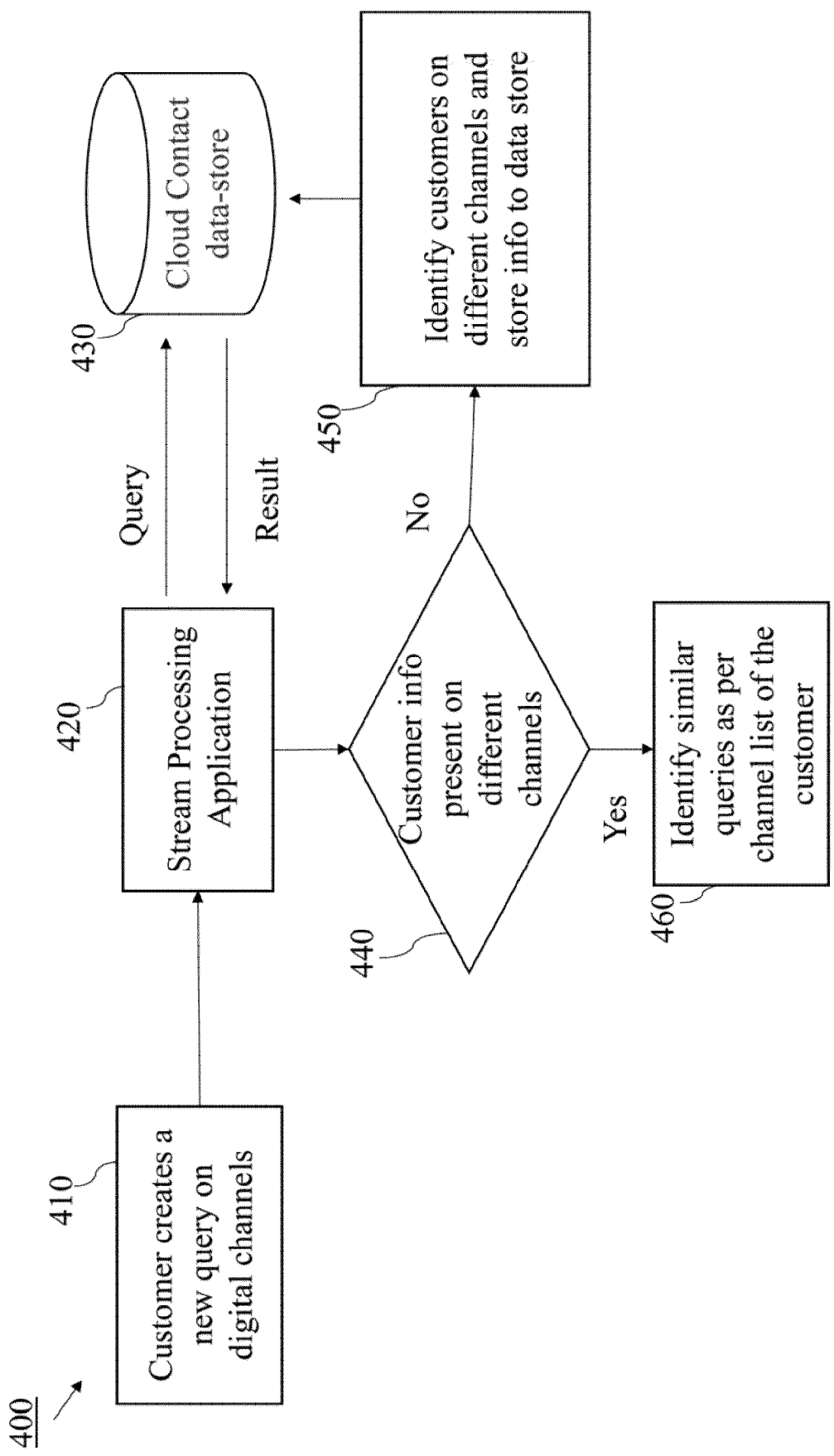
FIG. 4 schematically illustrates a high-level diagram of identifying same customer on different channels when customer creates a new query, in accordance with some embodiments of the present invention.

FIG. 4 schematically illustrates a high-level diagram 400 of identifying same customer on different channels when customer creates a new query, in accordance with some embodiments of the present invention.

According to some embodiments of the present disclosure, when a customer creates a new query on digital channels 410 a stream processing application 420 may check if there is customer information on the different channels 440, e.g., in the different interactions-queue types 440. If the customer information is not available, the query-related data of the new query may be stored in a data store, such as cloud-contact data store 430 and such as cloud-contact data store 310 in FIG. 3. If the customer information is available, identify similar queries as per channel list of the customer 430, e.g., identifying one or more queries of the customer in the cloud-contact data store 430.

According to some embodiments of the present disclosure, after the identifying of the same customer on different channels, when the customer creates a new query, a primary channel to communicate with the customer may be determined. The primary channel may be determined by a module by checking a wait-time of each interactions-queue type and selecting the primary channel-type according to related channel-type of interactions-queue having a lowest wait-time.

Figure 5:
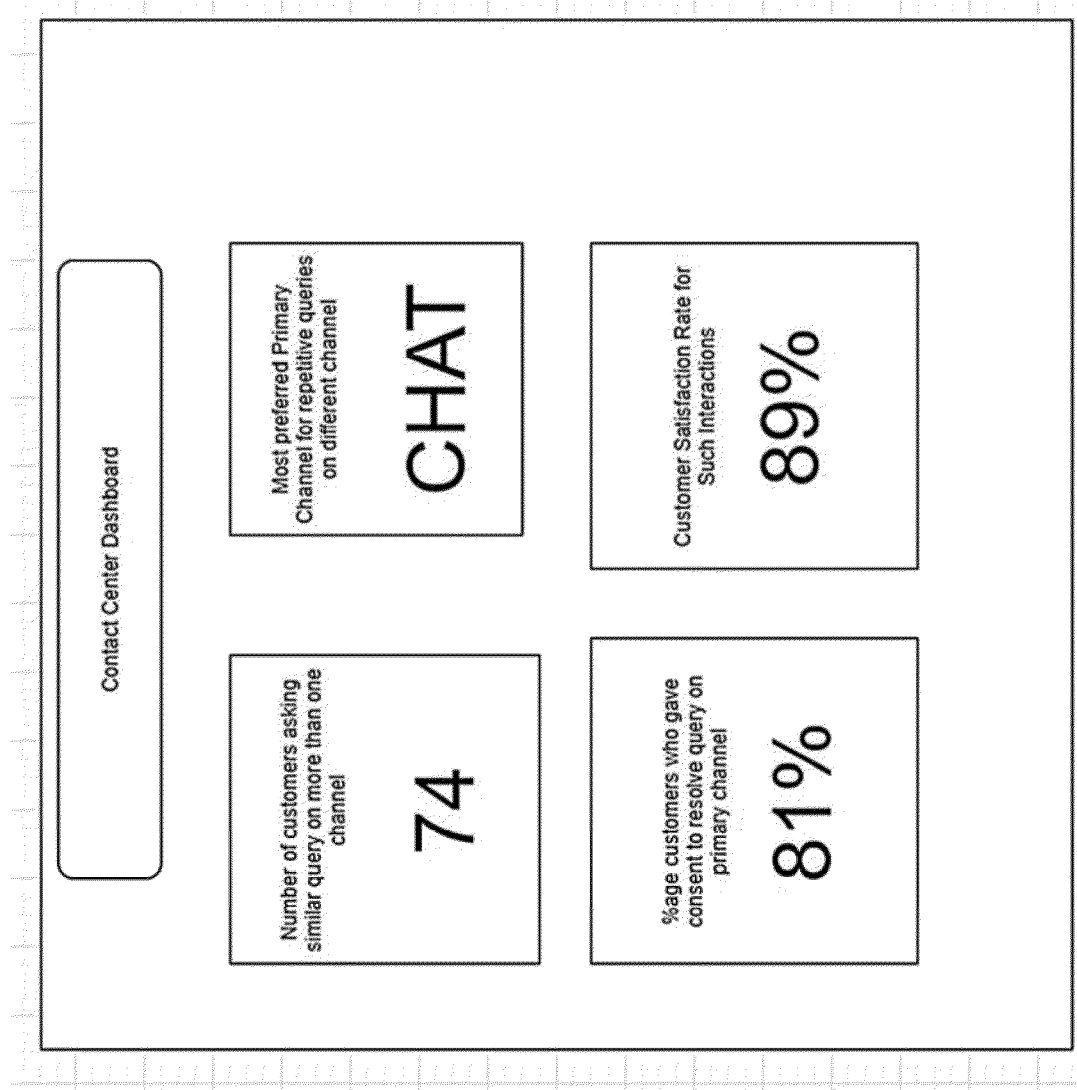
FIG. 5 shows an example of a contact center dashboard, in accordance with some embodiments of the present invention.

FIG. 5 shows an example 500 of a contact center dashboard, in accordance with some embodiments of the present invention.

According to some embodiments of the present disclosure, example 500 of a contact center dashboard, e.g., Graphical User Interface (GUI) shows a number of customers asking similar query on more than one channel types, e.g., 74 which denotes the number of customers who are duplicating an identical query on more than one channel types. The most preferred primary channel may be also displayed, e.g., 'chat'. The percentage of customers who gave their consent to resolve their query on the system's determined primary channel, i.e., the channel type that its related interactions-queue has the lowest wait time, e.g., 81%. Customers satisfaction rate for interactions involving more than one channel for same query resolved via primary channel may be also displayed, e.g., 89%.

Figure 6:
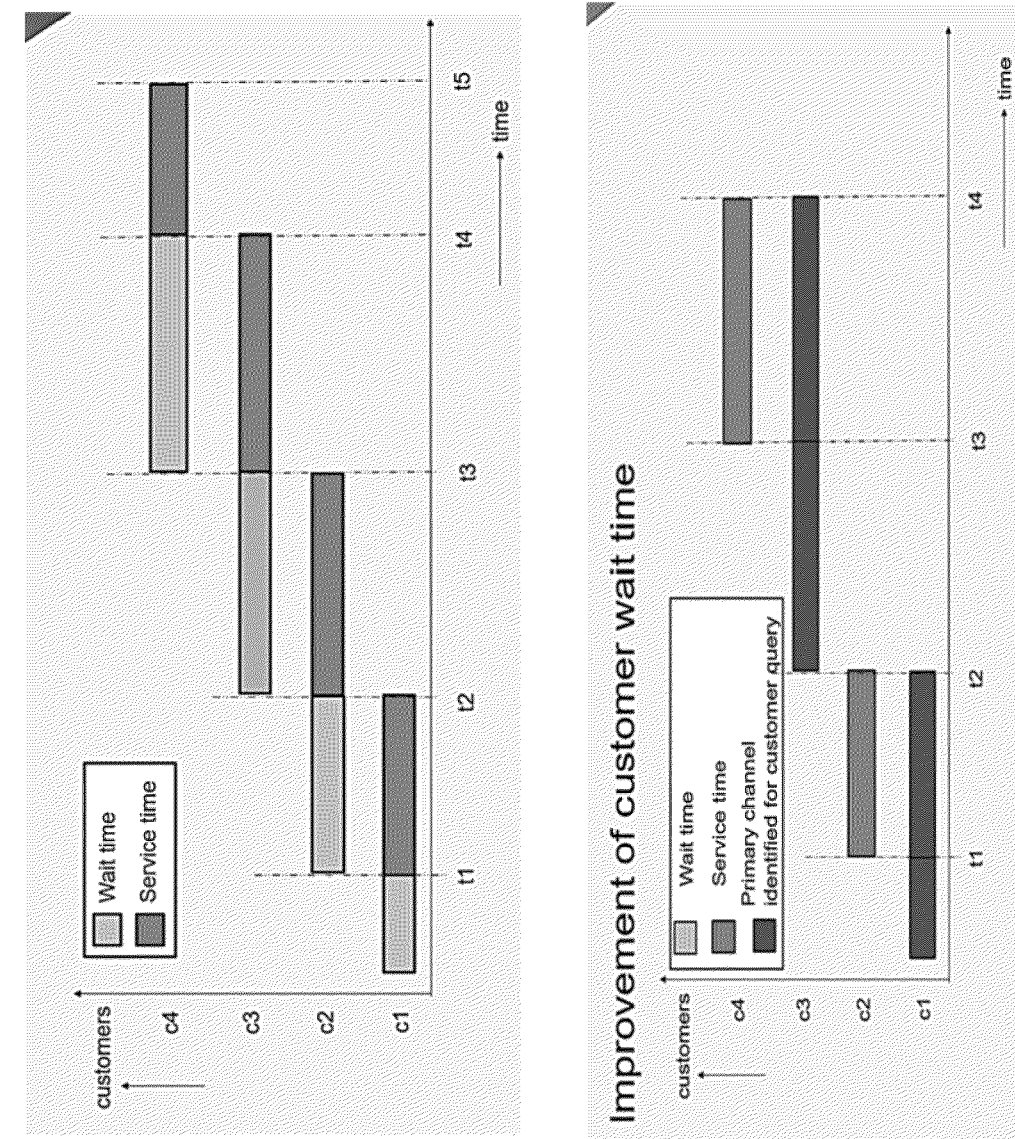
FIG. 6A shows a graph of customers waiting time without optimization.
FIG. 6B shows a graph of customers waiting time with an improved queries operation in a multichannel contact center, in accordance with some embodiments of the present invention.

FIG. 6A shows a graph 600A of customers waiting time without optimization.

According to some embodiments of the present disclosure, graph 600A shows an example of wait time and service time when four customers arrive and post their query on a particular digital channel. For example, if customer 'c1' posted a query 'q1', then the total query resolution time for customer 'c1' = 't2', 'c2' = 't3' - 't1', 'c3' = 't4'-'t2', 'c4' = 't5'-'t3'. Whenever a customer posted one or more queries, then other customers need to wait up to a certain time till the query ahead on the queue is being served. As shown in the graph 600A wait time and when the agent starts responding to the given query. The respective wait time for the customer query may be as follows: customer "c2" has to wait up wtc2= t2-t1, customer 'c3' has to wait up wtc3 = t3-t2, and customer 'c4' has to wait up wtc4 = t4-t3 time.

Meaning, when all customer 'c1', 'c2', 'c3', 'c4' have posted their query on same digital channel and customers 'c1' and 'c3', which is the same customer, have also posted their query in other channels as well, but customer 'c2' and 'c4' does not post their queries to any other channel, so when system 100A in FIG. 1A or computerized-method 200, for improving queries operation in a multichannel contact center, in FIG. 2 are not implemented, then customer 'c2' has to wait for customer 'c1' query to be resolved first and customer 'c4' has to be wait for customer 'c3' query to be resolved, as shown in graph 600A.

FIG. 6B shows a graph 600B of customers waiting time with an improved queries operation in a multichannel contact center, in accordance with some embodiments of the present invention.

According to some embodiments of the present disclosure, in a non-limiting example, graph 600B shows a scenario in which all customer 'c1', 'c2', 'c3', 'c4' have posted their query on same digital channel and customers 'c1' and 'c3', which is the same customer have posted their query also in other channel types, but customers 'c2' and 'c4' didn't post their queries in any other channel, so when system 100A in FIG. 1A or computerized-method 200, for improving queries operation in a multichannel contact center, in FIG. 2, are not implemented, then customer 'c2' has to wait for customer 'c1' query to be resolved first and customer 'c4' has to be wait for customer 'c3' query to be resolved as shown in graph 600A in FIG. 6A.

However, when system 100A in FIG. 1A or computerized-method 200, for improving queries operation in a multichannel contact center, in FIG. 2, are implemented, then the primary channel-type of customers 'c1' and 'c3', which is the same customer, may have been identified, based on lower wait time compared to the channel type of all customers in graphs 600A-600B. After the queries of customers 'c1' and 'c3' have been resolved in the identified primary channel, which is different from the channel type of all the customers in graphs 600A-600B, the queries of customers 'c1' and 'c3' may have been removed from the interactions-queue of the channel type of all the customers in graphs 600A-600B and thus an improvement in the wait time of the channel type of all the customers in graphs 600A-600B, may be achieved.

In another example, when all customers 'c1', 'c2', 'c3', 'c4' have posted their queries where customers 'c2' and 'c4' have posted in the same channel type and customers 'c1' and 'c3' which is the same customer, has posted in different digital channel types and a primary channel has been identified for customers 'c1' and 'c3', an improvement in wait time may be observed after the query of customers 'c1' and 'c3' has been resolved via the primary channel-type for all other customers in interactions-queue types.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for improving queries operation in a multichannel contact center, said computerized-method comprising:
    operating a stream processing application for each new query of a customer to store query-related data and to identify one or more queries of the customer in a cloud-contact data store,
    wherein the cloud-contact data store is having one or more interactions-queue types; when the one or more queries of the customer have been identified:
        (i) operating a repetition module on the identified one or more queries of the customer to filter out two or more queries having a common query-topic;
        (ii) operating a Natural Language Understanding (NLU) module on the filtered two or more queries having a common topic to identify two or more identical queries,
            wherein each query of the identified two or more identical queries have a unique query identification number; and
        (iii) handling the two or more identical.

2. The computerized-method of claim 1, wherein the handling of the two or more identical queries is operated by:
    (i) operating a primary channel identification module to determine a primary channel-type for a query to be resolved, from the identified two or more identical queries,
        wherein the query has a query identification number;
    (ii) reducing a priority of all queries having a different query identification number than the query to be resolved, in each related interactions-queue type;
    (iii) having an agent interacting with the customer regarding the query to be resolved, via the primary channel-type; and
    (iv) removing all queries having a different query identification number than the query to be resolved from each related interactions-queue type, after the query to be resolved has been marked as resolved.

3. The computerized-method of claim 1, wherein the query-related data comprising: a customer identification-number; a query identification-number; a channel-type; a query initiation-time; an estimated wait-time; and a query-topic.

4. The computerized-method of claim 3, wherein the stream processing application is identifying one or more queries of the customer based on the customer identification-number.

5. The computerized-method of claim 1, wherein after the determining of the primary channel-type for the query to be resolved, the computerized-method is further comprising sending a notification to the customer as to the customer preferred primary channel-type and wherein upon customer updating the determined primary channel-type when the primary channel-type is different than the customer preferred primary channel-type.

6. The computerized-method of claim 1, wherein the primary channel identification module to determine the primary channel-type is operating by checking a wait-time of each interactions-queue type and selecting the primary channel-type according to related channel-type of an interactions-queue having a lowest wait-time.

7. The computerized-method of claim 1, wherein when the computerized-method is operating in a cloud computing environment, before operating the stream processing application, the computerized-method is further comprising, selecting a tenant from a data store of tenants, every duty cycle period, to operate the stream processing application for each new query of a customer in the cloud-contact data store of the selected tenant.

8. A computerized-system for improving queries operation in a multichannel contact center, said computerized-system comprising:
- one or more processors;
- a cloud-contact data store; and
- a memory to store the cloud contact data store,
- said one or more processors are configured to operate a stream processing application for each new query of a customer, said stream processing application is operated to store query-related data and to identify one or more queries of the customer in the cloud-contact data store,
- wherein the cloud-contact data store is having one or more interactions-queue types;
- when the one or more queries of the customer have been identified, said one or more processors are further configured to:
  - (i) operate a repetition module on the identified one or more queries of the customer to filter out two or more queries having a common query-topic;
  - (ii) operate a Natural Language Understanding (NLU) module on the filtered two or more queries having a common topic to identify two or more identical queries,
    - wherein each query of the identified two or more identical queries have a unique query identification number; and
  - (iii) handle the two or more identical queries.

* * * * *